June 2, 1942.  G. CARSON  2,284,972
WORK SUPPORT AND HOLD DOWN MECHANISM
Filed Nov. 9, 1940
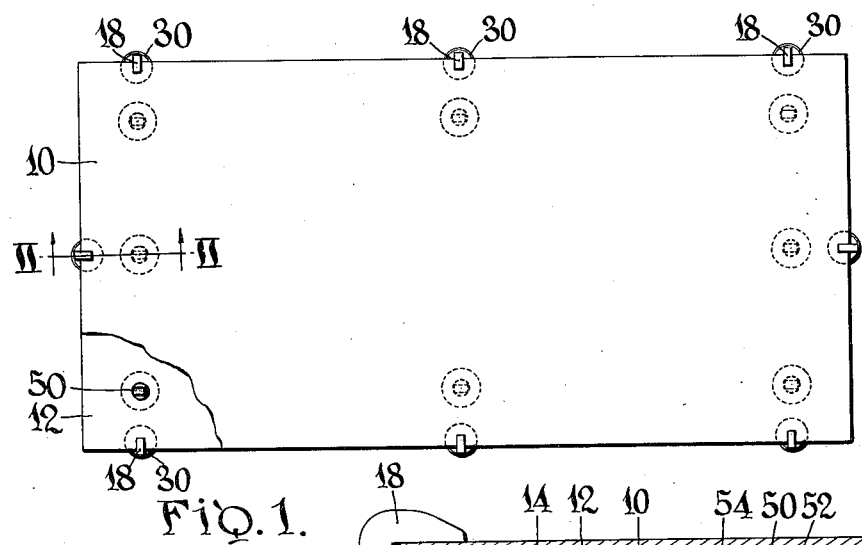
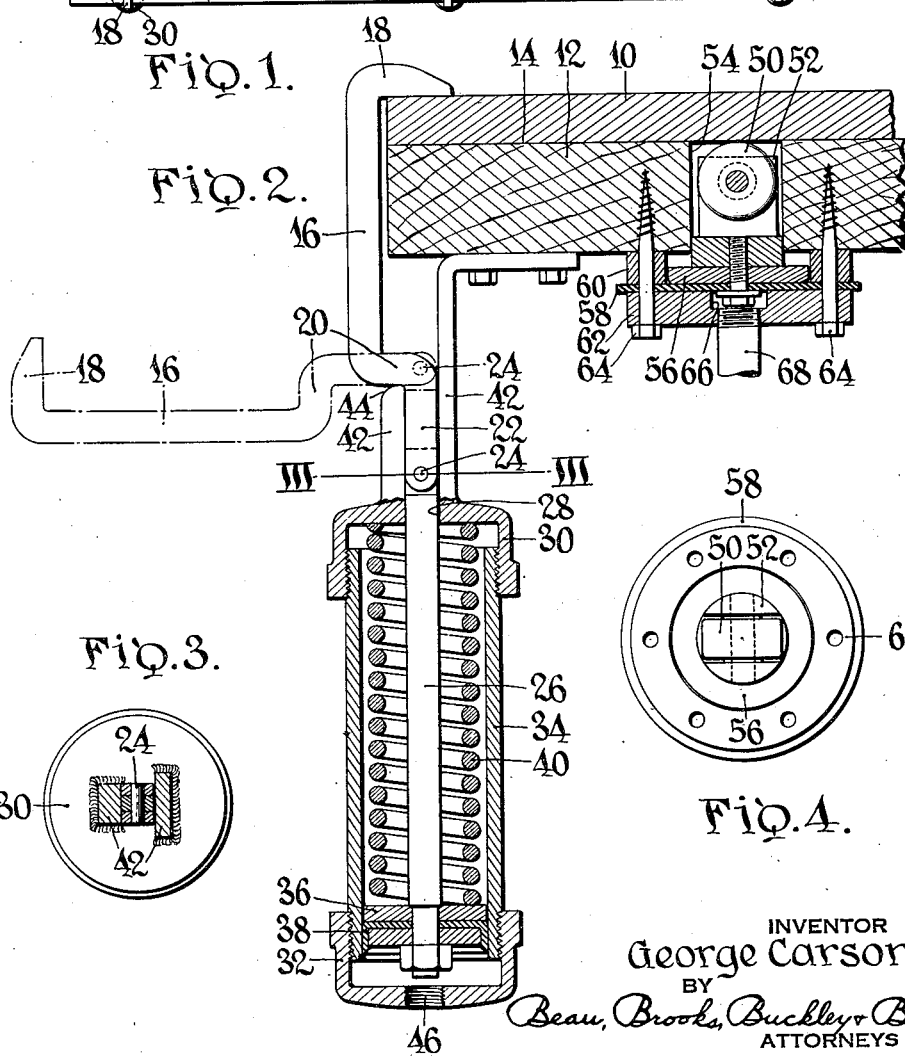
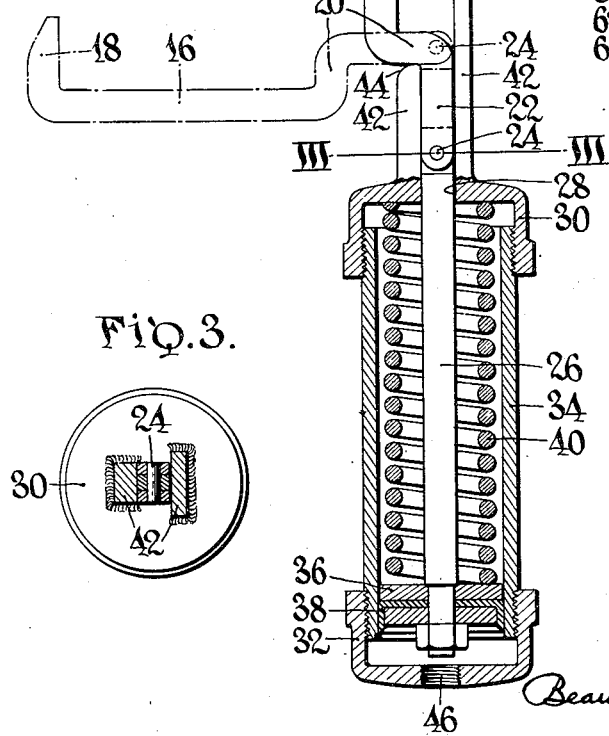
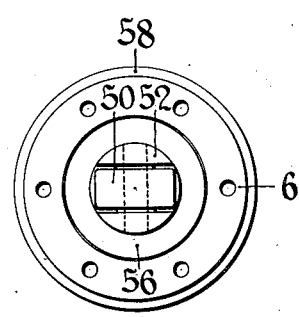
INVENTOR
George Carson,
BY
Beau, Brooks, Buckley & Beau
ATTORNEYS Patented June 2, 1942

2,284,972

UNITED STATES PATENT OFFICE 2,284,972

WORK SUPPORT AND HOLD-DOWN MECHANISM

George Carson, Buffalo, N. Y., assignor to Bell Aircraft Corporation, Buffalo, N. Y.

Application November 9, 1940, Serial No. 365,069

10 Claims. (Cl. 90—59)

This invention relates to automatic machine tools, and more particularly to work piece holding devices for use in conjunction with various machining operations. One of the objects of the invention is to provide an improved quick detachable work piece holding means which is positive in its work holding action and quickly releasable therefrom. Another object of the invention is to provide a work piece supporting mechanism comprising, in combination, a plane work piece supporting surface; a fluid pressure releasable device adapted to clamp the work piece upon the plane supporting surface in response to the action of an elastic member; and a second work piece supporting means comprising rolling work piece contacting elements projectable beyond said plane surface simultaneously with release of said work piece clamp device. Other objects and advantages of the invention will appear from the specification hereinafter.

In the drawing:

Fig. 1 is a top plan of a work piece supporting means of the invention showing a work piece supported thereon with a portion broken away to reveal part of the work piece supporting mechanism;

Fig. 2 is a typical vertical section, on an enlarged scale, through a unit portion of the work piece supporting and clamping mechanism, as along line II—II of Fig. 1;

Fig. 3 is a section taken substantially along line III—III of Fig. 2; and

Fig. 4 is a fragmentary plan of a portion of the work piece supporting mechanism thereof.

The drawing exemplifies the invention as applied to the support of a sheet metal work piece 10 of rectangular plan form, as beneath a router or a milling or drilling machine, or the like. The supporting structure includes a base board 12 having a plane upper surface 14 for backing up the work piece 10 in overall supported relation during the machining operation to be performed thereon. The work piece clamping mechanism comprises a plurality of hooks 16 having laterally bent end portions 18 adapted to overhang and clamp down upon adjacent edge portions of the work piece 10 in response to actuation of the clamping mechanism as will be described hereinafter. The hooks 16 are reversely bent adjacent their lower ends so as to provide shoulder portions 20 and straight stem portions 22 extending downwardly therebeyond into pivotal engagement through means of pins 24 with the upper ends of corresponding thrust members 26. The thrust members 26 are guided for vertical reciprocation adjacent their upper ends by means of bearing portions 28 of casing head members 30. Each clamping unit includes a second casing head member 32 arranged in opposed relation with respect to the first head member 30 and connected thereto by means of a tubular casing 34 which is mounted in screwthreaded relation therebetween so as to provide a closed fluid cylinder device. The lower ends of the thrust members 26 are provided with piston heads 36 which are fitted with sealing gaskets 38 so as to be freely slidable in fluid tight relation within the bore of the casing 34 in the well known manner of a fluid pressure responsive piston device. A compression spring 40 is mounted within the cylinder mechanism in such manner as to bear at one of its ends against the head 30 and at the other of its ends against the piston 36 so as to resiliently urge, at all times, the piston 36 toward the position thereof shown in Fig. 2.

The stem portion 22 of the hook 16 is slidably mounted within a guide device 42 extending as an integral portion of the casing head 30; and the guide device 42 is formed with a rounded abutment portion 44 over which the stem portion 22 of the hook member is adapted to rock toward the broken line position of the hook illustrated in Fig. 2 whenever the thrust member 26 is moved upwardly against the action of the spring 40 to such position as to dispose the pivotal connection 24 above the level of the abutment 44, as illustrated by broken lines in Fig. 2. It will be understood that the disposition of the forces of gravity will ordinarily suffice to cause the hook 16 to topple from vertical attitude toward the horizontal attitude illustrated by broken lines whenever the pivotal connection 24 is disposed above the level of the abutment 44 as explained hereinabove. However, if desired, some suitable form of accessory device such as a spring or the like may be arranged to bear against the hook member in such manner as to positively cause it to move into horizontally inclined attitude whenever the thrust member is raised so that the hook portions 18 will be removed from possible interference with displacement of the work piece 10 from the supporting table.

To actuate the hooks 16 out of work piece clamping position, a fluid inlet port 46 is provided through the cylinder head 32 for connection with a suitable source of fluid under pressure sufficient to overcome the force of the spring 40, and it will be understood that any suitable form of two-way control valve for the inlet and outlet of fluid through the port 46 will be provided so that the operator of the machine may at will cause the thrust members 26 to be actuated so as to operate the hook 16 between work piece clamping and releasing positions. Thus, a work piece clamping mechanism of simple and rugged form is provided of such nature that the work piece clamping forces are uniformly positive as regulated by the selected strength of the springs 40, and therefore the clamping forces are not subject to variations such as would be the case if pneumatic pressures or the like were relied upon to force the hooks into work piece clamping position. Also, it will be understood that release of the hooks 16 from work piece clamping position is quickly obtained through actuation of the fluid pressure responsive elements of the mechanism; and hence a quick acting work piece clamping and releasing mechanism of positive type is provided.

Further work piece supporting means is provided in the form of a plurality of rollers 50 which are rotatably mounted upon pins extending from brackets 52 arranged to be reciprocated within recesses 54 in the base board 12. The brackets 52 are bolted to plates 56 which abut at their opposite faces with a pliable diaphragm 58 fixed to the under surface of the base board 12 by means of an annular boss 60 and a cover plate 62 bolted together as a unit with the base board 12 by means of screws 64. The cover plate 62 is bored at 66 adjacent the center section of the diaphragm 58, and a fluid pressure inlet conduit 68 is connected in open communication with the bored portion of the cover plate. Hence, admission of fluid under pressure through the conduit 68 will cause the diaphragm 58 to move the roller supporting structure upwardly from the position illustrated in Fig. 2 in such manner as to lift the work piece 10 out of contact with the base board 12. The conduits 68 are connected to the fluid supply conduits leading to the cylinder ports 46 so that admission of fluid pressures against the diaphragms 58 automatically occurs simultaneously with admission of fluid pressure into the cylinders 34. Thus, simultaneously with the actuation of the thrust members 26 into hook releasing position the rollers 50 are actuated to lift the work piece 10 away from the base board 12 and thus to support the work piece in such position as to be readily movable in frictionless manner laterally of the work piece supporting structure. Thus, successive work pieces may be conveniently rolled across the table into and out of operative positions under the associated machine tool, and lowering of the work piece into uniformly backed up relation upon the base board 12 and actuation of the hooks 16 into clamping position is simultaneously procured in response to actuation of the fluid pressure control valve in such manner as to release the fluid acting against the pistons 36 and the diaphragms 58.

It is contemplated, that if desired, the work piece elevating elements of the mechanism may be of spherical form and mounted in suitable socketed portions of the brackets 52, in lieu of being in the form of the rollers 50 illustrated and described hereinabove. Thus, the supporting elements would be adapted to support the work piece for free rolling movement in any direction parallel to the plane of the base board 12 for the purpose hereinabove explained, and it will be understood that although only one form of the invention has been shown and described in detail, it will be apparent to those skilled in the art that the invention is not so limited but that various changes may be made therein without departing from the spirit of the invention or the scope of the appended claims.

What is claimed is:

1. A work piece hold down device comprising a clamp member movable into and out of work piece clamping position, means for actuating said clamping member toward work piece clamping position including a preloaded elastically deformed member, means for moving said clamp member out of work piece clamping position against the action of said elastic member including a fluid pressure motor device.

2. In combination, a work piece supporting plate, a work piece holding device for releasably clamping a work piece against said plate, a second work piece supporting element movably mounted upon said plate and adapted to be moved to project therebeyond to support the work piece independently of said plate, means for actuating said holding device and said second work piece supporting element in such manner as to automatically cause said second supporting element to be projected to assume the support of said work piece upon release of said holding device and to withdraw from work piece supporting position upon actuation of said holding device into work piece clamping position.

3. A work piece holding device comprising a fluid pressure cylinder, a piston mounted within said cylinder and upon a connecting rod having an end portion extending externally of said cylinder, a work piece clamping arm pivotally connected to the extending end portion of said connecting rod, spring means operatively associated with said device so as to resiliently urge said clamping arm toward work piece clamping position, fluid inlet means operatively associated with said cylinder to introduce fluid under pressure therein to actuate said connecting rod against the action of said spring means to move said clamping arm toward work piece disengaging position.

4. A work piece holding device comprising a fluid pressure cylinder, a piston mounted within said cylinder and upon a connecting rod having an end portion extending externally of said cylinder, a work piece clamping arm pivotally connected to the extending end portion of said connecting rod, spring means operatively associated with said device so as to resiliently urge said clamping arm toward work piece clamping position, fluid inlet means operatively associated with said cylinder to introduce fluid under pressure therein to actuate said connecting rod against the action of said spring means to move said clamping arm toward work piece disengaging position, and means operatively associated with said clamping arm to cause the latter to be rotated about its pivotal connection with said connecting rod against the forces of gravity between work piece clamping and disengaging positions upon movement of said connecting rod.

5. A work piece holding device comprising a fluid pressure cylinder, a piston mounted within said cylinder and upon a connecting rod having a portion extending externally of said cylinder, a work piece clamping arm pivotally connected to the extending portion of said connecting rod, spring means mounted within said cylinder and operatively associated with said piston and connecting rod so as to resiliently urge the latter to move said clamping arm into work piece clamping position, fluid inlet means operatively associated with said cylinder to introduce fluid under pressure against said piston so as to actuate said connecting rod against the action of said spring to cause said clamping arm to move toward work piece disengaging position, and fixed abutment means associated with said clamping arm to cause the latter to move into erect work piece clamping position against the forces of gravity upon movement of said piston and connecting rod under the action of said spring, said abutment means being so arranged as to permit said clamping arm to rotate about its pivotal connection toward a non-erect work piece disengaging position in response to the forces of gravity upon movement of said connecting rod to work piece disengaging position in response to introduced fluid pressure forces.

6. In combination, a work piece supporting plate, a second work piece supporting element movably mounted upon said plate and adapted to be moved to project beyond the work piece supporting face thereof to support the work piece independently of said plate, a work piece holding device comprising a fluid pressure cylinder, a piston mounted within said cylinder and upon a connecting rod having an end portion extending externally of said cylinder, a work piece clamping arm pivotally connected to the extending end portion of said connecting rod, spring means operatively associated with said device so as to resiliently urge said clamping arm toward work piece clamping position, fluid inlet means operatively associated with said cylinder to introduce fluid under pressure therein to actuate said connecting rod against the action of said spring means to move said clamping arm toward work piece disengaging position, and means operatively associated with said clamping arm to cause the latter to be rotated about its pivotal connection with said connecting rod against the forces of gravity between work piece clamping and disengaging positions upon movement of said connecting rod, fluid pressure responsive means operatively associated with said second work piece supporting element for moving the latter relative to said supporting plate, fluid pressure supply means associated with said fluid inlet means and said fluid pressure responsive means in such manner as to cause said second supporting element to move into independent work piece supporting position upon movement of said clamping arm toward work piece disengaging position and to withdraw from work piece supporting position upon movement of said clamping arm toward work piece holding position.

7. In combination, a work piece supporting plate, a work piece holding device for releasably clamping a work piece against said plate, a second work piece supporting element movably mounted upon said plate and adapted to be moved to project therebeyond to support the work piece independently of said plate, means for actuating said holding device and said second work piece supporting element in such manner as to automatically cause said second supporting element to be projected to assume the support of said work piece upon release of said holding device and to withdraw from work piece supporting position upon actuation of said holding device into work piece clamping position, said second work piece supporting element being provided with a freely rotatable work piece contact portion.

8. A work piece holding device comprising a relatively flat work supporting table, a plurality of clamp elements movable vertically adjacent the edges of said table and having overhanging portions for engaging work supported thereby, said clamp elements having depending portions, a vertically disposed operating cylinder for each of said clamping elements, a piston fixed to each of said depending portions and movable vertically in said cylinder, a compression coil spring in each of said cylinders acting between the upper end thereof and the piston to urge said clamp elements normally downwardly into clamping position, and means for selectively introducing a fluid medium into said cylinders to raise said clamp elements against said coil springs to release the work piece.

9. A work piece holding device comprising a relatively flat work supporting table, a plurality of clamp elements movable vertically adjacent the edges of said table and having overhanging portions for engaging work supported thereby, said clamp elements having depending portions, a vertically disposed operating cylinder for each of said clamping elements, a piston fixed to each of said depending portions and movable vertically in said cylinder, a compression coil spring in each of said cylinders acting between the upper end thereof and the piston to urge said clamp elements normally downwardly into clamping position, means for selectively introducing a fluid medium into said cylinders to raise said clamp elements against said coil springs to release the work piece, and auxiliary work supporting means for raising the work piece from the table, said auxiliary means comprising anti-friction rollers projectible through openings on said table and fluid means operable simultaneously with said first mentioned fluid means for projecting said rollers into work supporting position.

10. A work piece holding device comprising a relatively flat work supporting table, a plurality of clamp elements movable vertically adjacent the edges of said table and having overhanging portions for engaging work supported thereby, said clamp elements having depending portions, a vertically disposed operating cylinder for each of said clamping elements, a piston fixed to each of said depending portions and movable vertically in said cylinder, a compression coil spring in each of said cylinders acting between the upper end thereof and the piston to urge said clamp elements normally downwardly into clamping position, and means for selectively introducing a fluid medium into said cylinders to raise said clamp elements against said coil springs to release the work piece, said overhanging portions being movable laterally away from the edge of said table by and upon upward movement thereof and automatically movable laterally to overhanging relation upon downward clamping movement thereof.

GEORGE CARSON.